United States Patent [19]
Mies et al.

[11] Patent Number: 5,727,326
[45] Date of Patent: Mar. 17, 1998

[54] PIVOTABLE TWO-COORDINATE SCANNING HEAD WITH HORIZONTAL MAIN AXIS

[75] Inventors: Georg Mies, Wipperfürth; Günter Mikoleizig, Hückeswagen, both of Germany

[73] Assignee: Klingelnberg Sohne GmbH, Remscheid, Germany

[21] Appl. No.: 587,653

[22] Filed: Jan. 17, 1996

[30] Foreign Application Priority Data

Jan. 17, 1995 [DE] Germany .................. 195 01 178.3

[51] Int. Cl.$^6$ .................................................. G01B 5/016
[52] U.S. Cl. ............... 33/501.9; 33/501.14; 33/559; 33/561; 73/162
[58] Field of Search ................ 33/501.9, 501.14, 33/501.15, 501.16, 501.17, 501.18, 556, 558, 559, 561; 73/162

[56] References Cited

U.S. PATENT DOCUMENTS

| | | | |
|---|---|---|---|
| 3,936,946 | 2/1976 | Ruffner et al. | 33/501.14 |
| 3,943,633 | 3/1976 | Ruffner | 33/501.14 |
| 4,166,323 | 9/1979 | Maag | 33/501.9 |
| 4,356,556 | 10/1982 | Sterki | 33/501.9 |
| 4,535,543 | 8/1985 | Linder | 33/556 |
| 4,601,111 | 7/1986 | Berchtold | 33/556 |
| 4,610,091 | 9/1986 | Bertz et al. | 33/501.15 |
| 4,646,443 | 3/1987 | Hofler | 33/501.15 |
| 4,646,566 | 3/1987 | Hofler | 33/501.14 |
| 4,703,261 | 10/1987 | Berchtold | 33/558 |
| 4,716,656 | 1/1988 | Maddock et al. | 33/561 |
| 4,882,848 | 11/1989 | Breyer et al. | 33/559 |
| 4,937,948 | 7/1990 | Herzog et al. | 33/556 |
| 5,005,297 | 4/1991 | Aehnelt et al. | 33/556 |
| 5,029,398 | 7/1991 | Ertl | 33/559 |

FOREIGN PATENT DOCUMENTS

| | | | |
|---|---|---|---|
| 1226314 | 10/1966 | Germany | 33/501.14 |
| 2217174 | 12/1972 | Germany | 33/558 |
| 37 25 207 A1 | 2/1989 | Germany . | |
| 38 43 125 A1 | 6/1990 | Germany . | |
| 39 05 952 A1 | 8/1990 | Germany . | |
| 4318741 | 12/1994 | Germany | 33/559 |
| 204403 | 12/1982 | Japan | 33/501.14 |
| 175716 | 7/1988 | Japan | 33/501.14 |
| 1229373 | 4/1971 | United Kingdom | 33/501.9 |

*Primary Examiner*—Thomas B. Will
*Attorney, Agent, or Firm*—Antonelli, Terry, Stout & Kraus, LLP

[57] ABSTRACT

The scanning head according to the invention has the horizontal main axis (1) and is provided for numerically controlled gear measuring devices. Its feeler (2) is guided by a linear slide (4) and the latter is guided by a leaf spring parallelogram (11, 12, 13, 14) in the two coordinate directions (6) and (16). Mechanical devices (8) and (18) hold the feeler in a definite central position from which it can be deflected with the same measuring force in both the positive and negative coordinate directions. A centrally located two-dimensional ruled grating scale (10) detects all deflections of the feeler in the plane spanned by the two coordinates. To adjust the third coordinate direction, a pivot mechanism (3) is used, with a roller bearing (2) being provided for weight balance for the leaf spring parallelogram, the outer ring of the bearing being suspended by at least two springs (21, 22) on a fixed part (23) above the scanning head.

3 Claims, 4 Drawing Sheets

PIVOTABLE TWO-COORDINATE SCANNING HEAD WITH HORIZONTAL MAIN AXIS

BACKGROUND OF THE INVENTION

The present invention relates to a pivotable two-coordinate scanning head with horizontal main axis for measuring gears and gearlike workpieces on numerically controlled measuring devices.

Such CNC measuring devices, on which internal teeth, bevel gears, worms, tooth-cutting tools and the like, in addition to externally toothed spur gears, are measured, have a vertical rotational axis and receive the rotationally symmetrical workpieces coaxially. The measuring device guides the scanning head vertically and radially toward the workpiece to be tested, with the lengthwise axis of the feeler having a horizontal position, and the workpiece rotates until the feeler contacts it at a predeterminable position. To measure a desired tooth topography, the curved tooth surface must be scanned in the normal direction at every point. For this purpose, the scanner can be deflected in all three coordinate directions in space. In addition, it must be possible, in order to measure for example a tooth root fillet, a continuous transition from one contact direction to another direction perpendicular thereto. Switching the scanning direction at about 45° results in inadmissibly large inaccuracies. To measure distances such as the width of a tooth gap, it is necessary for scans to be made in exactly opposite directions. This can be best accomplished by the feeler being deflectable from a defined central position in one direction and in the opposite direction.

While as a rule scanning heads are used in a suspended design on universal 3D measuring devices, measuring scanners with a horizontal design are mainly used in gear-measuring devices. This difference is important because the direction of gravity has a major influence on the design of such a scanning head. In addition, a distinction must be made between scanners of the switching type and the measuring type as described for example in DE-OS 37 25 205. During gear measurement, scanners of the measuring type are used as a rule because the measuring device guides the respective scanning head over the desired contour and the deviations are then measured and indicated directly. As a result, short measuring times with high measuring accuracy can be achieved. However, a prerequisite is that the deflection direction of the feeler must be in the required normal direction, and there are several design possibilities for this. One of them is to use a two-coordinate scanning head which can be pivoted to generate the third coordinate around an axis fixed in space.

A plurality of scanning heads for gear measuring devices is known which however do not combine the universality, measurement and adjustment speed, and measurement accuracy required for a modern CNC measuring device, in order to be able to measure a gear completely fully automatically in a short time. Such complete measurement includes at least profile, lead, and pitch measurements.

Thus for example a measuring scanner with a horizontal design is known from DE-OS 36 25 636 which comprises a leaf spring parallelogram, an incremental measuring system, and an aerostatic measuring force generation, which does not however ensure a definite central position of the feeler. In addition, it is only provided for a single coordinate direction.

German Patent 34 26 315 teaches another single coordinate scanning head based on the goal of performing measurements without switching to the right or left tooth flank, from a constant central position of the feeler, over the entire measurement distance with a constant measuring force. This goal is achieved in an embodiment with a leaf spring parallelogram essentially by virtue of the fact that the central position is achieved by two spring-mounted rotary beams and the constant measuring force is produced by permanent magnets. The disadvantage is that permanent magnets as such, and especially in the long term, are nonuniform and therefore the rotary beams must each be adjusted tediously with two adjusting screws each. In addition, this known solution is unsuited for expansion from one-coordinate to two-coordinate measurement.

In addition, a scanning head for coordinate measuring devices according to DE-OS 37 25 207 is known which bears a feeler that can be deflected in all three directions in space, and the entire scanning head itself can be placed in any position in space. A taring device is provided for the purpose which automatically returns the spring system that supports the scanning head to the zero position when it is moved by changing the scanning head position in space and consequently by a change in the direction of gravity. This scanning head therefore can also be used for horizontal feeler positions; however, it has the following disadvantages for a gear-measuring device: The feeler is held for two coordinate directions by a cardan joint made of leaf springs, and the leaf spring parallelogram for the third coordinate direction also guides the feeler in such fashion that it does not move parallel to itself but pivots around an axis. As a result, the measuring system depends upon the length of the feeler.

In a universal gear measuring device, the feeler must however be easily replaceable in order to adjust for the respective measuring task, for example internal toothing. In addition, the three taring devices required for the three directions in space are quite expensive: Each consists of two springs, one of which can be pretensioned differently with a small motor, an opto-electronic zero-position indicator, and a corresponding electronic control system.

SUMMARY OF THE INVENTION

Therefore the goal of the present invention is to improve a scanning head of the species recited at the outset for use on a numerically controlled measuring device in such fashion that it is suitable for rapid, complete measurement of a gear, and the measuring system employed has a simple and operationally reliable design.

This goal is achieved by the combination of features as follows.

A pivotable two-coordinate scanning head with horizontal main axis (1) for measuring gears and gearlike workpieces on numerically controlled measuring devices consisting of two superimposed straight guides, with which a feeler (2) can be deflected in both one coordinate direction (6) and also in a coordinate direction (16) perpendicular thereto, with deflection direction (6) of the first straight guide coinciding with main axis (1), and a pivot mechanism (3) which rotates the two straight guides into predeterminable angular positions around the main axis (1), with a weight balance being provided for the movable parts, characterized in that a) the two superimposed straight guides consist of a linear slide (4) with roller bearing (9) for the first coordinate direction (6) and a parallelogram system (11, 12, 13, 14) with leaf spring joints (19) for the second coordinate direction (16);

b) on linear slide (4) a two-dimensional ruled grating scale (10) is mounted for the two-coordinate directions (6, 16), said scale being read simultaneously by two read heads (7, 17) located on the base (12) of the parallelogram system;

c) a first mechanical device (8) is provided which holds the linear slide (4) in a definite central position (5) from which feeler (2) can be deflected with the same measuring force in both the positive and negative coordinate directions (6);

d) a second mechanical device (18) is provided which holds the parallelogram system (11, 12, 13, 14) in a central position (15) defined by main axis (1), from which feeler (2) can be deflected with the same measuring force in both the positive and negative coordinate directions (16); and e) a roller bearing (20) coaxial with respect to main axis (1) is provided on coupling member (14) of parallelogram system (11, 12, 13, 14) for weight balancing, and is suspended by two tension springs (21, 22) mounted diametrically on the roller bearing outer ring at a fixed housing part (23).

A number of the advantages of the two-coordinate scanning head according to the invention result from the fact that the two superimposed straight guides do not consist of an otherwise conventional parallel arrangement of two similar systems, such as spring parallelograms, cross spring joints, or roller guides, but of the space-saving combination of a leaf spring parallelogram and a linear roller guide located inside the parallelogram. A decidedly positive property of this combination is that the feeler is always guided parallel to itself, which is why its length has no influence on the increase in the measured value. The feeler can be changed to suit the measuring task and the calibration which is then required is very much simpler than with a feeler whose deflection is accomplished by rotation around an axis, in other words on a radius. It is also advantageous that the roller guide in the combination according to the invention is provided for the coordinate direction that coincides with the horizontal pivot axis of the scanning head. The matching linear slide is therefore statically and dynamically independent of the angular position of the scanning head and, in contrast to a leaf spring parallelogram, requires no weight balancing.

Further advantages will be apparent from an embodiment of the invention described below with reference to schematic drawings: For improved clarity, the individual parts of the scanning head, which is compact in itself, are shown slightly exploded.

DESCRIPTION OF THE PREFERRED EMBODIMENTS

Figure 1:
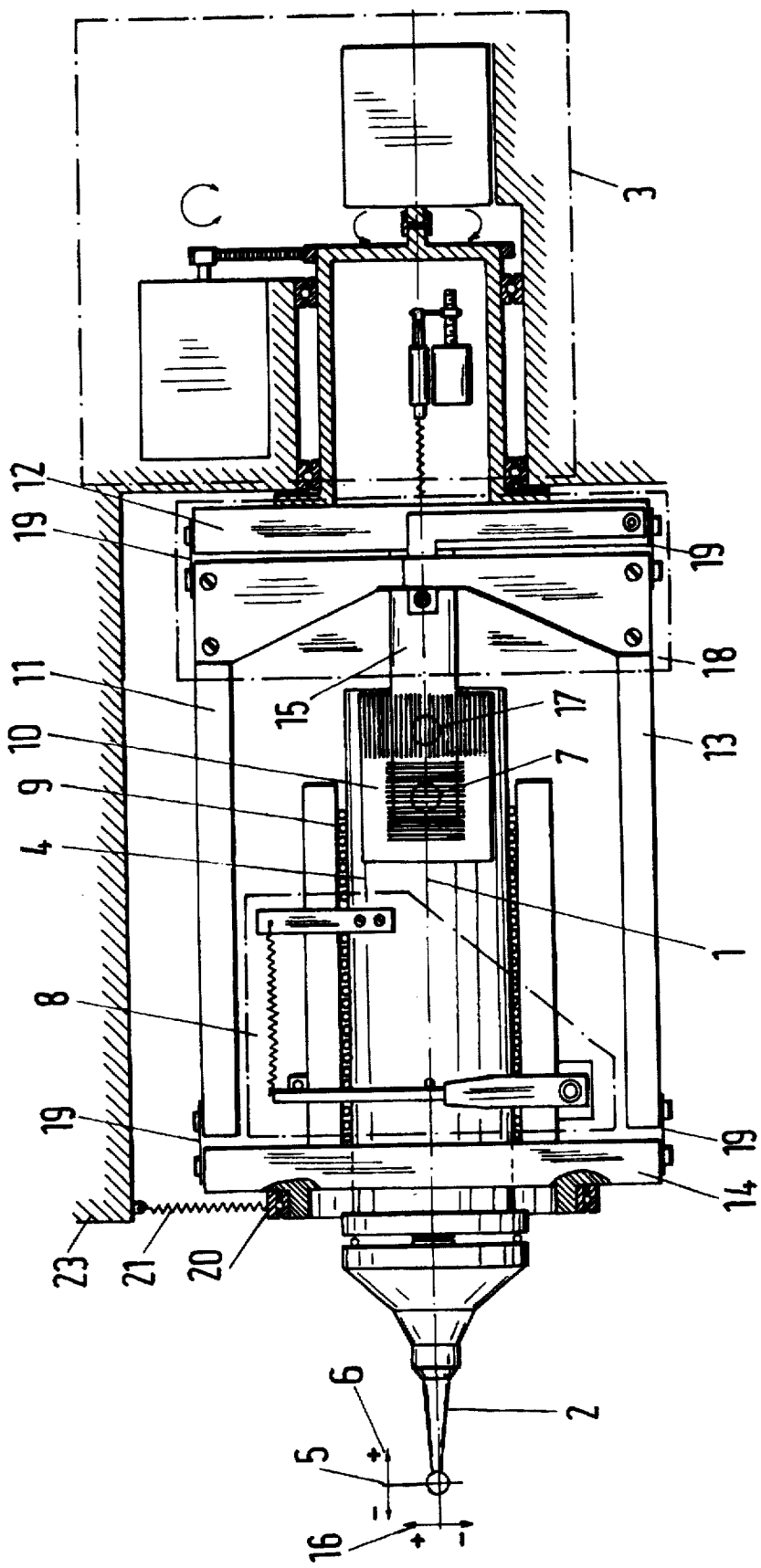
FIG. 1 shows a schematic diagram of the pivotable two-coordinate scanning head with horizontal main axis.

The scanning head shown in FIG. 1 in a side view has a horizontal main axis (1) with which the lengthwise axis of the non-deflected feeler (2) coincides. This feeler (2) is attached by a conventional collision protection device on linear slide (4), which is guided by a very precise roller bearing (9) and makes the feeler deflectable in first coordinate direction (6). Roller guide (9) in turn is mounted centrally on the movable coupling element (14) of a parallelogram system (11, 12, 13, 14), provided with four friction-free leaf spring joints (19). As a result, linear slide (4) together with feeler (2) can be simultaneously deflected in the second coordinate direction (16) as well, which is perpendicular to coordinate direction (6). A plane two-dimensional ruled grating scale (10) is provided on linear slide (4). The associated read heads (7) and (17) are mounted on an arm (15) which is mounted symmetrically with respect to main axis (1) on base member (12) of parallelogram system (11, 12, 13, 14). This zero contact incremental measuring system detects all deflections of feeler (2) in the plane spanned by the two coordinate directions (6) and (16), as well as the gentle arc on which the parallelogram really guides the feeler. On linear slide (4) a mechanical device (8) is provided in addition to scale (10) and holds linear slide (4) for its coordinate direction (6) in a definite central position (5). From this central position, feeler (2) can be deflected in both the positive and negative coordinate directions (6), depending on the side from which it comes in contact with the workpiece. A corresponding mechanical device (18) is provided on parallelogram system (11, 12, 13, 14) for its coordinate direction (16). The exact function of these two devices will now be described with reference to FIG. 3 and FIG. 4 in connection with their preferable design.

Figure 2:
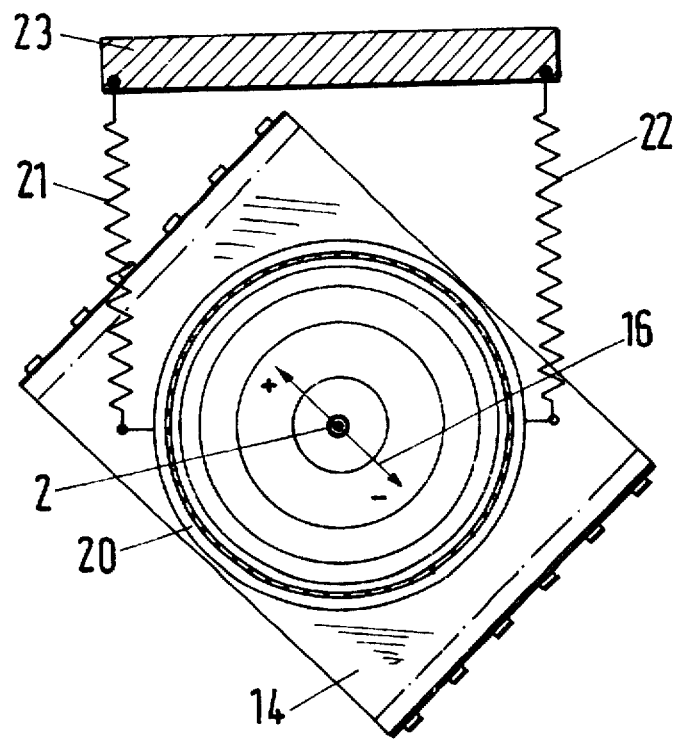
FIG. 2 shows a front view of the scanning head.
Figure 2:
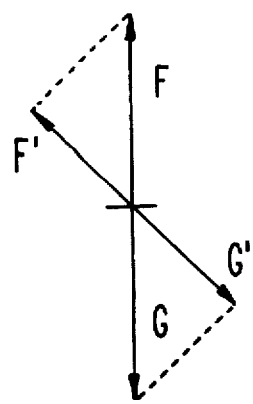

With the aid of pivot mechanism (3), which consists primarily of a drive, not shown in greater detail in FIG. 1, and a precise angle measurement system, base member (12) and hence the entire scanning head described above can pivot around main axis (1) into predeterminable angular positions. In order for this pivoting motion to take place uniformly during a continuous measuring process, the pivotable part of the non-deflected scanning head is preferably made symmetrical with respect to main axis (1), so that its center of gravity lies on main axis (1). In order for the force of gravity that acts in coordinate direction (16) in FIG. 1 not to deflect the parallelogram system, according to the invention, roller bearing (20) is mounted on coupling member (14) coaxially with respect to main axis (1). According to FIG. 2, roller bearing (20) is suspended by two springs (21, 22) fastened diametrally on its outer ring, on a fixed part (23) above the scanning head.

The operation consists in the two springs evidently bearing the entire weight of the parallelogram system, which acts on roller bearing (20) at the angular position of the scanning head shown in FIG. 1. However, even when the scanning head is pivoted into another angular position, the load on springs (21, 22) remains constant in terms of magnitude and direction because the lateral gravity component generated by one degree of freedom of the parallelogram system is cancelled by the spring force acting fully on the roller bearing. It is only with a deflection of feeler (2) that the spring force changes by the negligibly small amount of deflection times the spring stiffness. The type of suspension according to the invention with more than one spring prevents the frictional moment of roller bearing (20) having a negative effect on its position with respect to main axis (1). For use of a feeler (2) that is heavier than the one shown, a device not shown here in greater detail can be provided for simultaneous tensioning of the two springs (21, 22).

Figure 3:
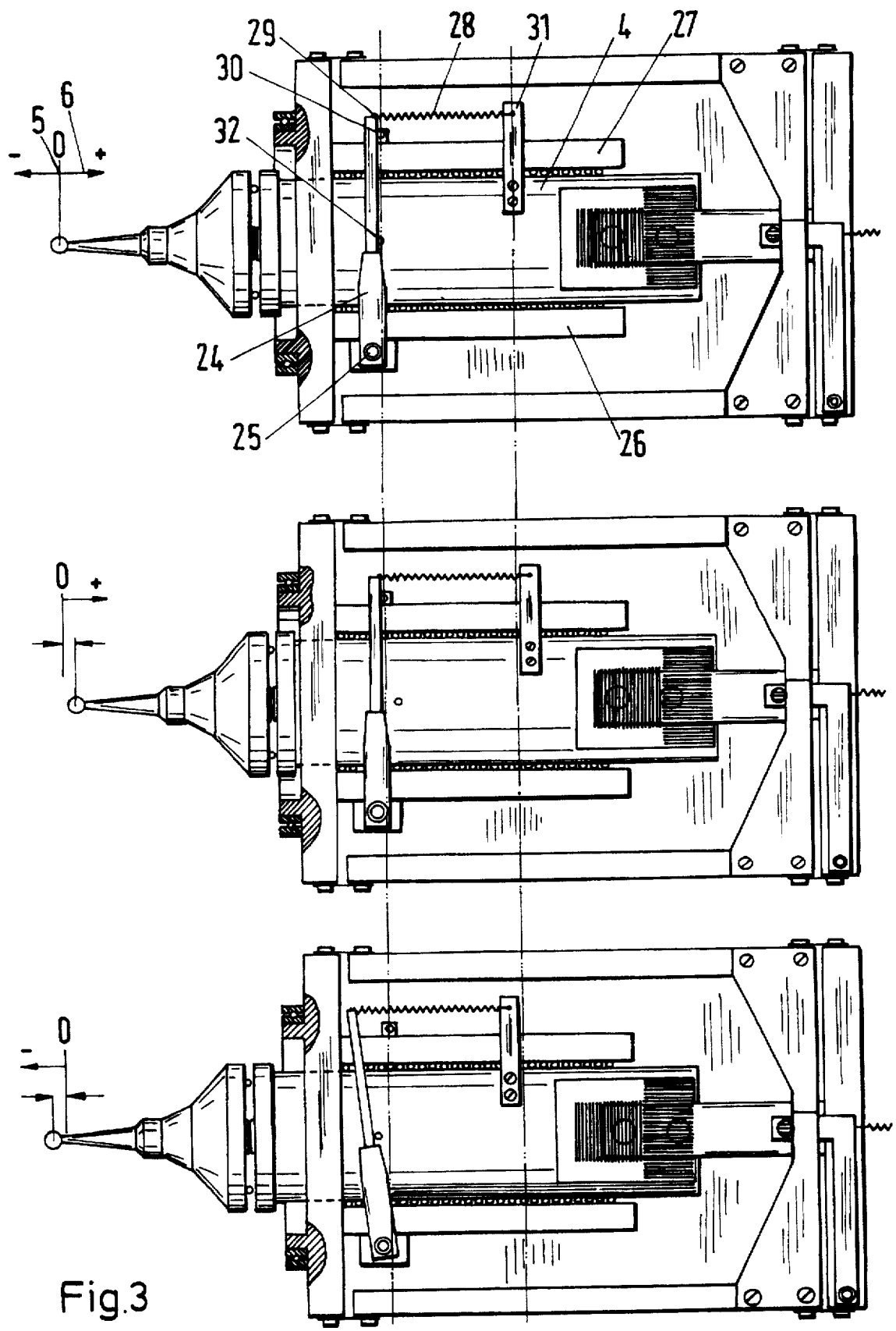
FIG. 3 shows, in three related partial drawings, the function of the mechanical device for generating a definite central position of the linear slide.

FIG. 3 consists of three partial drawings linked by orientation lines and showing a preferred embodiment of mechanical device (8). This device holds linear slide (4) as shown in the upper partial drawing in a definite central position (5) in such fashion that spring (28) pulls linear slide (4) with its stop (32) against lever (24). Lever (24) is rotatably mounted on one side of fixed guide rail (26) and on the other side, at fixed stop (30), abuts the other guide rail (27) of linear slide (4). Since spring (28) is fastened firstly by tab (31) on linear slide (4) and secondly at point (29) on lever (24), a stable state results.

If linear slide (4) is deflected in the positive coordinate direction (6) against the force of tensioned spring (28), as shown exaggerated in the middle partial drawing, stop (32) moves away from lever (24), tab (31) shifts by the same amount, and further tensions spring (28) while lever (24) remains resting against stop (30).

With a deflection of linear slide (4) in the negative coordinate direction (6) according to the lower partial drawing, stop (32) presses lever (24) away from stop (30). Then spring (28) is tensioned further to the same extent as in the previous case, because although it relaxes at tab (31) by the deflection travel of linear slide (4), it is tensioned again by the doubled travel of its other fastening point (29). This is accomplished with lever (24) in such fashion that the distance of point (29) from axis (25) is twice as great as the distance of stop (32) from axis (25). Pretensioning of spring (28) determines the measuring force of feeler (2) in its coordinate direction (6), which is exactly the same for both positive and negative deflection. As a result of the length of spring (28) relative to the measurement distance, the change in measuring force as a result of the deflection of linear slide (49) is negligibly small.

Figure 4:
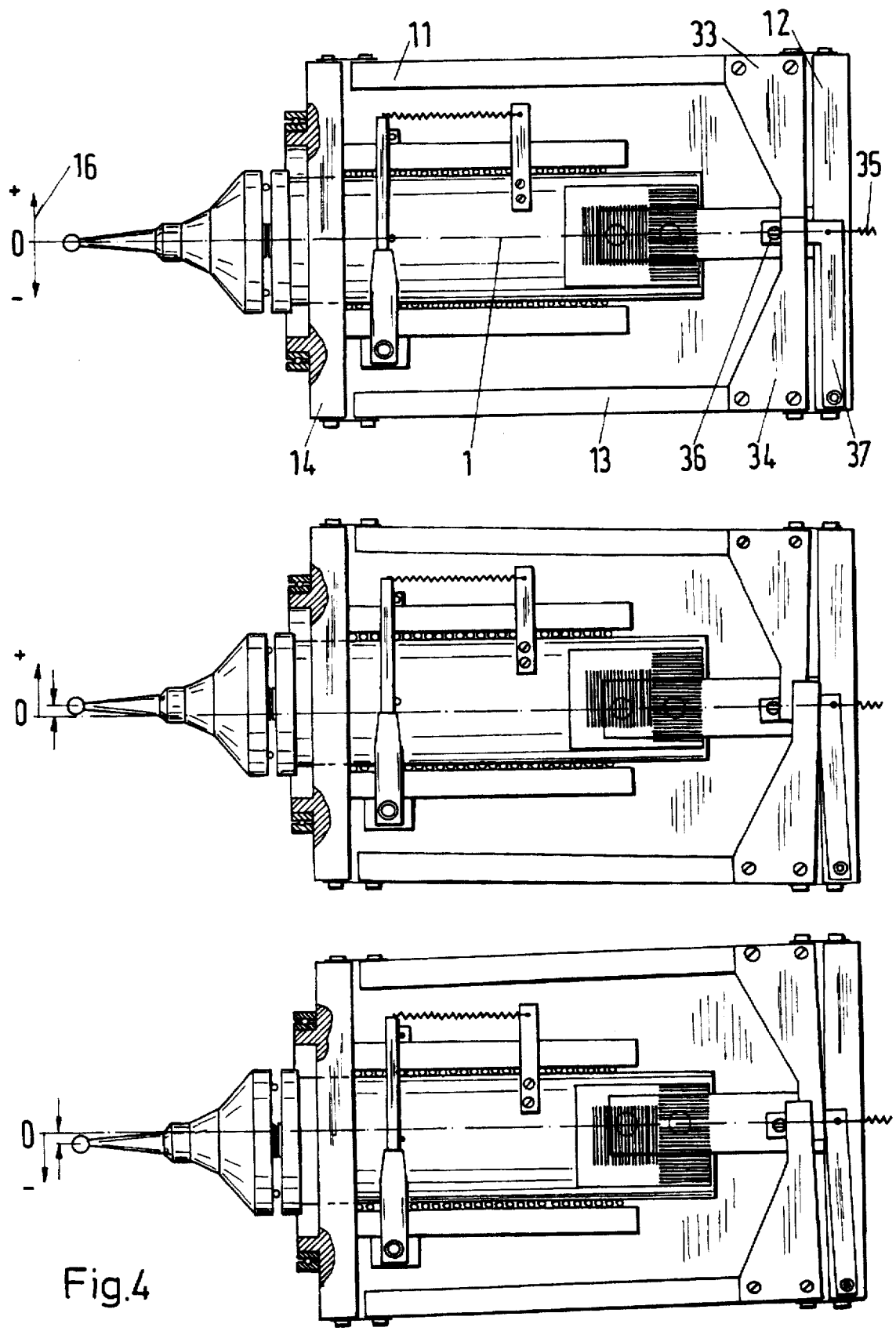
FIG. 4 shows, in three related partial drawings, the function of the mechanical device for generating a definite central position of the leaf spring parallelogram.

FIG. 4, shows in three related partial drawings that correspond to those in FIG. 3, a preferred embodiment of mechanical device (18). It holds parallelogram system (11, 12, 13, 14) with respect to its coordinate direction (16) in the middle position defined by main axis (1). As shown in the upper partial drawing, a tab (33) and (34) is fastened to each of members (11) and (13), said tabs overlapping in the vicinity of main axis (1). Spring (35) pulls stop (36), which is guided by bell crank (37) on main axis (1), against the two tabs (33, 34), resulting in a stable state of the parallelogram system (11, 12, 13, 14).

If the parallelogram system is then deflected in positive coordinate direction (16), as shown exaggerated in the middle partial drawing, tab (33) presses stop (36) against the force of spring (35) and tensions it a little further. At the same time, tab (34) moves away from stop (36) in the opposite direction.

With a deflection of parallelogram system (11, 12, 13, 14) in the negative coordinate direction (16) according to the lower partial drawing, the conditions are reversed. Tab (34) presses stop (36) against the force of spring (35) and tensions it further in the same direction as in the previous case and tab (33) moves away in the opposite direction from stop (36). Pretensioning of spring (35), because of the lever ratio, determines the measuring force of feeler (2) in its coordinate direction (16), which is exactly the same with both positive and negative deflection. Pretensioning of spring (35) can also be varied by a motor indicated in FIG. 1 in order to adapt the measuring force in simple fashion to that of coordinate device (6) or the respective measuring task.

The advantages that result from the two mechanical devices (8) and (18) shown above consist in the fact that the central position of the feeler is always readjusted very accurately in both coordinate directions (6) and (16), although no costly adjustments need to be made when the scanning head is assembled. The two zero points on the ruled grating scale (10) are determined by the central positions that automatically result. The switching of the measuring direction with the aid of mechanical, electrical, or pneumatic additional devices, which is frequently employed, is completely absent. In addition, with the slightest deflection of the feeler, the full measuring force is immediately available and there is no dead travel. The central position of the feeler, from which the parallelogram system can deflect in the positive and negative coordinate directions, has the additional advantage that pivot mechanism (3) must pivot the scanning head through only 180° instead of through 360°, which considerably increases the speed until the scanning head is set by the CNC measuring device.

Advantages of the invention result from the fact that the measurement of feeler deflection takes place in two-coordinate directions at one point in the scanning head and with one measuring system. The two-dimensional ruled grating measuring scale (10) detects, centrally, all deflections of the feeler and can be mounted more simply than inductive measuring systems that usually must be used separately for each coordinate direction. In addition, the measuring accuracy is much higher, especially with large deflections. The combination of roller guidance and the parallelogram system has the advantage that large deflections are admissible for both coordinate directions because the two straight guides do not interfere with one another. Large deflections are especially important for automatically operating CNC measuring devices, for safety reasons alone, in order to have an overshoot until stoppage after the measuring travel is exceeded and the measuring device is switched off.

We claim:

1. A pivotable two-coordinate scanning head with a horizontal main axis for measuring gears and gearlike workpieces on numerically controlled measuring devices comprising first and second superimposed straight guides, with which a feeler can be deflected in both a first coordinate direction and in a second coordinate direction perpendicular to said first direction, with the first straight guide providing the deflection in the first coordinate direction which also coincides with the main axis, and further including a pivot mechanism which rotates the first and second straight guides into predeterminable angular positions around the main axis and a weight balance set-up for the first and second guides, characterized in that;

a) the first superimposed straight guide consists of a linear slide with roller bearing for providing the deflection in the first coordinate direction and the second superimposed straight guide consists of a parallelogram system including a first member, a base, a second member and a coupling member with leaf spring joints for providing the deflection in the second coordinate direction;

b) the linear slide including a two dimensional ruled grating scale mounted thereon for the two coordinate directions, said scale being read simultaneously by two read heads located on the base of the parallelogram system;

c) a first mechanical device is provided which holds the linear slide in a definite central position from which the feeler can be deflected with an equal measuring force in both positive and negative directions along the first coordinate direction;

d) a second mechanical device is provided which holds the parallelogram system in a central position defined by the main axis, from which the feeler can be deflected with an equal measuring force in both positive and negative directions along the second coordinate direction;

e) the weight balance set up including a roller bearing coaxial with respect to the main axis provided on the coupling member of the parallelogram system and suspended by two tension springs mounted diametrically on an outer ring of the roller bearing and extending from a fixed housing part.

2. The pivotable two-coordinate scanning head according to claim 1 characterized in that the first mechanical device consists of a lever rotatably attached at an axis to a first guide rail of the linear slide and a tension spring, that extends from a point on the lever to a tab attached to the slide, which draws the lever against a first stop on a second guide rail of the linear slide and a second stop on the slide, wherein the distance from the axis to the spring attachment at point is exactly twice as large as the distance from the axis to the second stop.

3. The pivotable two-coordinate scanning head according to claim 1 or 2 characterized in that the second mechanical device consists of two tabs, each of which is fastened to a respective one of the first and second members of the parallelogram system, said tabs being positioned to overlap near the main axis, said tabs jointly abutting a stop located on a bell crank attached to the base of the parallelogram system and tensioned by a spring attached to the bell crank so as to be displaceable on the main axis.

* * * * *